Patented Oct. 22, 1935

2,018,354

UNITED STATES PATENT OFFICE 2,018,354

METHOD OF PURIFYING AND DECOLORIZING CINCHOPHEN

Ernest F. Grether, Midland, Mich., assignor to The Dow Chemical Company, Midland, Mich., a corporation of Michigan No Drawing. Application April 28, 1932, Serial No. 608,137

12 Claims. (Cl. 260—39)

The present invention concerns a method of purifying and decolorizing cinchophen (alpha-phenylcinchoninic acid) so as to obtain the same in a relatively stable and pure form having a white color.

The usual method of purifying cinchophen is first to treat an aqueous solution containing an alkali metal salt of said compound with a decolorizing charcoal, then to filter the solution, and gradually acidify the filtrate with that quantity of a mineral acid (e. g. sulphuric acid, hydrochloric acid, etc.) required to precipitate the cinchophen. The product is then filtered from the mixture, washed thoroughly with water, and dried.

Through careful operation in the manner described above, cinchophen may be obtained in very nearly pure form. The product, however, is light and bulky, and usually of a yellowish color, or becomes yellow after standing for a relatively short period of time.

I have now found that cinchophen may be purified through crystallizing its ammonium salt from an aqueous solution, and liberating the free product from said crystalline salt with an excess of a liquid, water soluble carboxylic acid. The purified product so obtained is relatively dense in form, pure white in color, and comparatively stable toward the influences which usually cause discoloration of cinchophen on standing.

To the accomplishment of the foregoing and related ends, the invention, then, consists of the steps hereinafter fully described and particularly pointed out in the claims, the following description setting forth in detail one mode of carrying out the invention, such disclosed mode illustrating, however, but one of the various ways in which the principle of the invention may be used.

In purifying cinchophen according to my improved method, I heat a mixture of, preferably, from about 700 to about 800 parts, by weight, of water and about 72 parts of cinchophen to a temperature between about 80° C. and the boiling point of the mixture. Either gaseous or aqueous ammonia is then added thereto until the cinchophen is dissolved. Ordinarily, I find the addition of about 26 parts, by weight, of a 28 per cent ammonium hydroxide solution to be sufficient to bring about solution of the cinchophen. About 1 part, by weight, of a decolorizing charcoal is then added, the mixture boiled for about 10 minutes, and then filtered or centrifuged while hot. The filtrate at this point should contain practically all of the ammonium salt and will contain said salt and water in the ratio, preferably, of about 1 part, by weight, of the salt (ammonium alpha-phenylcinchonate) and between about 9 and about 12 parts of water. The solution is then cooled to about room temperature, whereupon about 75 to about 85 per cent of the cinchophen employed crystallizes as its ammonium salt. The latter is separated from its mother liquor and washed with water. The mother liquor from the crystallization may be employed to crystallize successive batches of ammonium alpha-phenylcinchonate, or it may be acidified to precipitate the residual impure cinchophen and the latter be combined with a fresh quantity of crude cinchophen and be re-treated in the manner described above.

The crystalline ammonium salt of cinchophen may be recrystallized a second time from water to purify it completely, but ordinarily such treatment is unnecessary as the subsequent step of liberating free cinchophen from said salt is, in itself, a purification step.

The crystalline ammonium alpha-phenylcinchonate is mixed thoroughly with about 3 times its weight of glacial acetic acid and the mass is permitted to stand for some time (preferably, 2 hours or longer). The mass is then diluted with, preferably, about 6 or more times its weight of water and filtered or centrifuged. The residue is washed thoroughly with water, then preferably pressed nearly free of water, and dried. The product, so obtained, consists of a relatively dense form of pure, white cinchophen which does not discolor readily upon standing. The yield of purified product from a single treatment of a batch of crude material, usually amounts to between about 75 and about 85 per cent of the total quantity of cinchophen employed. However, as previously pointed out, the impure residual cinchophen may be returned to the process, so that the loss of cinchophen, during operation, is small.

In the foregoing detailed description, I have set forth a specific mode of operation which I find to be convenient in practicing my invention. The principle of the invention may, however, be employed in ways other than those previously mentioned. In a known method of making cinchophen, for instance, the latter is first formed as an alkali metal salt thereof. I find that a solution of such salt (or of any water soluble cinchophen salt) may advantageously be treated with ammonia or a water soluble ammonium salt (e. g. ammonium chloride, ammonium acetate, ammonium carbonate, etc.) and that the relatively insoluble ammonium salt of cinchophen may be crystallized directly from the resultant mixture or solution in substantially pure form.

The crystalline ammonium alpha-phenylcinchonate may be treated with acetic acid to obtain free cinchophen in accordance with the procedure described in the preceding paragraph. The method of purification herein described, is combined, in such case, with steps in the process of making cinchophen.

In practicing my invention, the relative quantities of the various agents employed may be varied widely from the proportions previously mentioned. I may, for instance, crystallize the ammonium salt of cinchophen (ammonium alpha-phenylcinchonate) from a relatively dilute aqueous solution thereof. Furthermore, the ammonium alpha-phenylcinchonate may be crystallized from mixtures of water with water-miscible solvents, e. g. methyl alcohol, ethyl alcohol, acetone, etc. While, during such crystallization, I find it most convenient to cool the mixture to about room temperature before filtering the crystalline salt therefrom, the mixture may be filtered at either a higher or a lower temperature and the salt so separated is in purified form.

Again, although I prefer to liberate cinchophen from its ammonium salt through treating the latter with an excess of concentrated (preferably glacial) acetic acid at about room temperature, any water soluble carboxylic acid which may be maintained in liquid or dissolved form during employment (e. g. formic acid, acetic acid, propionic acid, butyric acid, valeric acid, lactic acid, etc.), may be used in amount chemically in excess of the quantity of ammonium salt treated, and the treatment may be carried out at any temperature between the freezing point and boiling point of the mixture. Although any liquid, water soluble carboxylic acid may be employed to liberate cinchophen from its ammonium salt, I find it advisable to use an acid selected from the group consisting of formic, acetic, and propionic acids for such purpose. The higher acids, e. g. butyric and valeric acids, possess an offensive odor which may be removed from the product only with difficulty. For convenient operation the formic, acetic, or propionic acid should be employed as a more than 75 per cent acid solution thereof, and preferably is employed as the substantially anhydrous acid. A relatively dilute acid solution (e. g. 50 per cent formic, acetic, or propionic acid solution) may, however, be employed successfully, though less conveniently, to effect the desired end.

The alkali metal, alkaline earth metal, and magnesium salts of cinchophen may also be acidified with an excess of a liquid carboxylic acid in a manner similar to that described above, to liberate cinchophen of improved quality with regard to color and purity.

The present invention, in brief, comprises purifying and decolorizing cinochophen through crystallizing the ammonium salt thereof from an aqueous solvent, and liberating purified cinchophen from the crystalline ammonium salt through treating the latter with an excess of a liquid, water soluble carboxylic acid.

In the following claims, the expression "liquid carboxylic acid" shall be understood to mean a carboxylic acid which is maintained in liquid or dissolved form during employment.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a method of purifying and decolorizing cinchophen, the step which consists in crystallizing ammonium alpha-phenylcinchonate from an aqueous solution thereof.

2. In a method of purifying and decolorizing cinchophen, the step which consists in cooling a heated solution, containing about 1 part by weight of ammonium alpha-phenylcinchonate and between about 9 parts and about 12 parts by weight of water, whereby ammonium alpha-phenylcinchonate is crystallized from the solution.

3. In a method of purifying and decolorizing cinchophen, the step which consists in acidifying a solid salt of cinchophen selected from the group consisting of the ammonium, alkali metal, alkaline earth metal, and magnesium salts of cinchophen with more than its chemical equivalent of a concentrated liquid water soluble carboxylic acid.

4. In a method of purifying and decolorizing cinchophen, the step which consists in acidifying solid ammonium alpha-phenylcinchonate with more than its chemical equivalent of a substantially anhydrous fatty acid containing not more than 3 carbon atoms to the molecule.

5. In a method of purifying and decolorizing cinchophen, the step which consists in acidifying purified ammonium alpha-phenylcinchonate with more than its chemical equivalent of a greater than 75 per cent acetic acid solution.

6. In a method of purifying and decolorizing cinchophen, the steps which consist in mixing purified, crystalline ammonium alpha-phenylcinchonate with more than its chemical equivalent of glacial acetic acid, permitting the mixture to stand for at least 2 hours, diluting the mixture with water, and separating crystalline cinchophen from the diluted mixture.

7. In a method of purifying and decolorizing cinchophen, the steps which consist in crystallizing ammonium alpha-phenylcinchonate from an aqueous solution thereof, separating the crystalline salt from its mother liquor, and treating the crystalline salt with more than its chemical equivalent of a fatty acid containing not more than 3 carbon atoms to the molecule.

8. In a method of purifying and decolorizing cinchophen, the steps which consist in cooling a heated solution, containing about 1 part by weight of ammonium alpha-phenylcinchonate and between about 9 parts and about 12 parts by weight of water, to crystallize ammonium alpha-phenylcinchonate therefrom, separating the crystalline salt from its mother liquor, mixing the crystalline ammonium salt with more than its chemical equivalent of a greater than 75 per cent acetic acid solution, diluting the acidified mixture with water, and separating cinchophen from the mixture.

9. In a method of purifying and decolorizing cinchophen, the steps which consist in heating a mixture of crude cinchophen and at least 10 times its weight of water to a temperature above about 80° C., treating the heated mixture with ammonia to dissolve the cinchophen, treating the resultant solution with a decolorizing charcoal, filtering the mixture while hot, crystallizing ammonium alpha-phenylcinchonate from the filtrate, separating the crystalline salt from its mother liquor, acidifying the latter to precipitate residual cinchophen, and returning the latter through the steps described above.

10. In a method of making cinchophen, the steps which consist in treating an aqueous solution containing a water soluble salt of cinchophen with a water soluble ammonia compound to form ammonium alpha-phenylcinchonate, and crystallizing the latter compound from the solution.

11. In a method of making cinchophen, the steps which consist in treating an aqueous solution containing an alkali metal salt of cinchophen with a water soluble ammonium salt, crystallizing ammonium alpha-phenylcinchonate from the resultant solution, separating the crystalline salt from its mother liquor, and treating said salt with more than its chemical equivalent of a fatty acid containing not more than 3 carbon atoms to the molecule.

12. In a method of making cinchophen, the steps which consist in treating an aqueous solution containing sodium alpha-phenylcinchonate with a water soluble ammonium salt in amount representing more than the chemical equivalent of the quantity of sodium alpha-phenylcinchonate treated, crystallizing ammonium alpha-phenylcinchonate from the resultant solution, separating the crystalline salt from its mother liquor, treating the crystalline ammonium alpha-phenylcinchonate with more than its chemical equivalent of a greater than 75 percent acetic acid solution, and separating purified cinchophen from the resultant mass.

ERNEST F. GRETHER.